United States Patent [19]

Kato et al.

[11] Patent Number: 5,322,888
[45] Date of Patent: Jun. 21, 1994

[54] COATING COMPOSITION FOR OPTICAL PLASTIC MOLDINGS

[75] Inventors: Hirohisa Kato; Sachio Murai; Mutsuyo Honda, all of Gamagori, Japan

[73] Assignee: Itoh Optical Industrial Co., Ltd., Gamagori, Japan

[21] Appl. No.: 902,026

[22] Filed: Jun. 22, 1992

[30] Foreign Application Priority Data

Jun. 25, 1991 [JP] Japan ............................. 3-153038
Jun. 25, 1991 [JP] Japan ............................. 3-153117

[51] Int. Cl.$^5$ .......................... C08L 83/04; C08K 3/10
[52] U.S. Cl. ............................. 524/783; 524/858; 524/789; 524/785; 524/847; 523/200; 523/209; 523/216; 106/287.15; 106/287.16
[58] Field of Search ............. 524/858, 789, 783, 785, 524/847; 106/287.15, 287.16; 523/200, 209, 216

[56] References Cited

U.S. PATENT DOCUMENTS

| | | | |
|---|---|---|---|
| 4,294,950 | 10/1981 | Kato | 528/14 |
| 4,311,738 | 1/1982 | Chi | 427/387 |
| 4,338,375 | 7/1982 | Hashimoto et al. | 428/412 |
| 4,980,401 | 12/1990 | Hinden | 523/461 |
| 5,013,788 | 5/1991 | Nagashima et al. | 524/767 |
| 5,134,191 | 7/1992 | Takarada et al. | 524/783 |

FOREIGN PATENT DOCUMENTS 0379343 7/1990 European Pat. Off.
2449117 9/1980 France.

OTHER PUBLICATIONS

Chemical Abstracts of Japan, vol. 115, No. 14, Oct. 7, 1991, of JP-A-3 068 901 (Toray Industries) Mar. 25, 1991.

*Primary Examiner*—John C. Bleutge
*Assistant Examiner*—M. W. Glass
*Attorney, Agent, or Firm*—Armstrong, Westerman, Hattori, McLeland & Naughton

[57] ABSTRACT

A coating composition that can be applied to optical plastic moldings having a high refractive index, to protect them from deterioration by light without any adverse effect on their optical functions. The coating composition contains the following essential constituents.

(A) 1 part of a hydrolyzate of a silane compound;
(B) 0.2-5 parts of titanium oxide-based composite fine particles having a particle diameter of 1-100 nm in which titanium oxide integrally combines with iron oxide, with the ratio of iron oxide to titanium oxide being 0.005-0.15 by weight;
(C) 0.02-0.5 part of an unsaturated or saturated polycarboxylic acid or an anhydride thereof; and
(D) 0.01-0.2 part of a heat-curing catalyst.

5 Claims, No Drawings

COATING COMPOSITION FOR OPTICAL PLASTIC MOLDINGS

BACKGROUND OF THE INVENTION

1. Field of the Invention:

The present invention relates to a coating composition for optical plastic moldings. The term "optical plastic moldings" as used in this specification implies plastic moldings for use as spectacle lenses, camera lenses, and other optical parts.

2. Description of the Prior Art:

Optical plastic moldings are expected to find use in various fields on account of their outstanding characteristic properties such as light weight, good processability, and high impact resistance. However, their use has been limited owing to their low hardness and poor resistance to scratch, light, and heat. They tend to decrease in hardness and resistance to scratch and light as they increase in refractive index. To eliminate these disadvantages optical plastic moldings are usually provided with hard coating film. The present inventors had previously proposed a coating composition for this purpose (Japanese Patent Publication No. 42665/1982). It is composed of a silane compound having an epoxy group, carboxylic acid, and curing agent and is applicable to dyeable optical plastic moldings. It has been put to practical use.

Unfortunately, this coating composition has been found to have a disadvantage that it brings about optical interference when it is applied to optical plastic moldings having a refractive index higher than 1.6, because it gives rise to a coating film having a refractive index in the neighborhood of 1.5. The interference is detrimental to the performance of the optical plastic moldings. Another disadvantage is that the coating film becomes poor in adhesion as the optical plastic moldings are deteriorated by light.

SUMMARY OF THE INVENTION

The present invention was completed to eliminate the above-mentioned disadvantages. It is an object of the present invention to provide a coating composition for optical plastic moldings which has no adverse effect on the optical performance when applied to optical plastic moldings having a high refractive index and yet completely protects optical plastic moldings from deterioration by light.

The first aspect of the present invention is embodied in a coating composition for optical plastic moldings which comprises:

(A) 1 part by weight of a hydrolyzate of a silane compound;

(B) 0.2–5 parts by weight of titanium oxide-based composite fine particles having a particle diameter of 1–100 nm in which titanium oxide integrally combines with iron oxide, with the ratio of iron oxide to titanium oxide being 0.005–0.15 by weight;

(C) 0.02–0.5 part by weight of an unsaturated or saturated polycarboxylic acid or an anhydride thereof; and (D) 0.01–0.2 part by weight of a heat-curing catalyst.

The second aspect of the present invention is embodied in a coating composition for optical plastic moldings which comprises:

(A) 1 part by weight of a hydrolyzate of a silane compound;

(B) 0.2–5 parts by weight of titanium oxide-based composite fine particles having a particle diameter of 1–100 nm in which titanium oxide integrally combines with silicon oxide, with the ratio of silicon oxide to titanium oxide being 0.03–0.7 by weight;

(C) 0.02–0.5 part by weight of an unsaturated or saturated polycarboxylic acid or an anhydride thereof; and (D) 0.01–0.2 part by weight of a heat-curing catalyst.

According to the present invention, the coating composition for optical plastic moldings has a specific composition as mentioned above, so that, when it is applied onto a substrate (plastic molding) and then cured, it forms a coating film which completely protects the plastic molding from deterioration by light, without impairing its optical properties, no matter how high its refractive index might be.

In other words, the coating composition of the present invention differs from the conventional one of the same kind in that it is composed of an organosilicon compound (as the major constituent), special titanium oxide-based composite fine particles, and a reactive polycarboxylic acid (or anhydride thereof), and a curing agent. It forms a coating film having good resistance to weathering, impact, heat, hot water, chemicals, and wear, and good clarity, flexibility, dyeability, and adhesion to deposited metal film. The coating film conforms to any optical plastic molding, no matter its refractive index.

DETAILED DESCRIPTION OF THE INVENTION

The constituents of the coating composition are explained in what follows. (Their amounts are expressed in terms of parts by weight, unless otherwise specified.)

(A) Hydrolyzate of silane compound:

(1) The silane compound is not specifically restricted, but the one having an epoxy group as represented by formula (1) below is preferable.

$$R_a^1 R_b^2 Si(OR^3)_{4-(a+b)} \tag{1}$$

(where $R^1$ denotes a $C_{2-8}$ organic group having an epoxy group; $R^2$ is a $C_{1-3}$ hydrocarbon group, halogenated hydrocarbon group, or aryl group; $R^3$ is a $C_{1-4}$ alkyl group, alkoxyalkyl group, or acyl group; and $a=1$, $b=0$, 1 or 2.)

Examples of the silane compound are given below.
glycidoxymethyltrimethoxysilane,
glycidoxymethyltriethoxysilane,
glycidoxymethyltripropoxysilane,
glycidoxymethyltributoxylsilane,
α-glycidoxyethyltrimethoxysilane,
α-glycidoxyethyltriethoxysilane
α-glycidoxyethyltripropoxysilane,
α-glycidoxyethyltributoxysilane,
β-glycidoxyethyltrimethoxysilane,
β-glycidoxyethyltriethoxysilane,
β-glycidoxyethyltripropoxysilane,
β-glycidoxyethyltributoxysilane,
α-glycidoxypropyltrimethoxysilane,
α-glycidoxypropyltriethoxysilane,
α-glycidoxypropyltripropoxysilane,
α-glycidoxypropyltributoxysilane,
β-glycidoxypropyltrimethoxysilane,
β-glycidoxypropyltriethoxysilane,
β-glycidoxypropyltripropoxysilane,
β-glycidoxypropyltributoxysilane,
γ-glycidoxypropyltrimethoxysilane,
γ-glycidoxypropyltriethoxysilane, γ-glycidoxypropyltributoxysilane,
α-glycidoxybutyltrimethoxysilane,
α-glycidoxybutyltriethoxysilane,
α-glycidoxybutyltripropoxysilane,
α-glycidoxybutyltributoxysilane,
β-glycidoxybutyltrimethoxysilane,
β-glycidoxybutyltriethoxysilane,
β-glycidoxybutyltripropoxysilane,
β-glycidoxybutyltributoxysilane,
γ-glycidoxybutyltrimethoxysilane,
γ-glycidoxybutyltriethoxysilane,
γ-glycidoxybutyltripropoxysilane,
γ-glycidoxybutyltributoxysilane,
glycidoxymethylmethyldimethoxysilane,
glycidoxymethylmethyldiethoxysilane,
glycidoxymethylmethyldipropoxysilane,
glycidoxymethylmethyldibutoxysilane,
α-glycidoxyethylmethyldimethoxysilane,
α-glycidoxyethylmethyldiethoxysilane,
α-glycidoxyethylmethyldipropoxysilane,
α-glycidoxyethylmethyldibutoxysilane,
β-glycidoxyethylmethyldimethoxysilane,
β-glycidoxyethylmethyldiethoxysilane,
α-glycidoxypropylethyldimethoxysilane,
α-glycidoxypropylethyldiethoxysilane,
β-glycidoxypropylethyldimethoxysilane,
γ-glycidoxypropylethyldipropoxysilane,
γ-glycidoxypropylethylbutoxysilane.

(2) It is desirable that the above-mentioned silane compound be used in combination with a tetraalkoxysilane represented by the formula (2) below.

$$Si(OR^1)_4 \qquad (2)$$

(where $R^1$ denotes an alkoxy group or alkoxyalkyl group.)

Examples of the tetraalkoxysilane are given below.
tetramethoxysilane,
tetraethoxysilane,
tetrapropoxysilane,
tetrabutoxysilane,
tetramethylmethoxysilane,
tetraethylethoxysilane,
tetrapropylpropoxysilane,
tetrabutylbutoxysilane.

(3) The silane compound having an epoxy group represented by the formula (1) above imparts wear resistance, impact resistance, hot water resistance, dyeability, clarity, and flexibility to the coating film (hard coat). The tetraalkoxy silane represented by the formula (2) above imparts wear resistance to the coating film but hardly imparts hot water resistance and flexibility to the coating film unlike the former silane compound. The coating composition of the present invention contains either or both of these silane compounds. In the latter case, the ratio of the first silane compound to the second should preferably be from 1:0.1 to 1:2 by weight.

(4) The silane compound should be hydrolyzed with pure water or an acidic aqueous solution (such as dilute hydrochloric acid). The hydrolysis may be accomplished after the silane compound has been mixed with a solvent. Examples of the solvent include lower alcohols, ketones, ethers, toluene, xylene, and monofunctional epoxy compounds. To accelerate the initial condensation reaction, the resulting solution should be refluxed at 50°-80° C. for 5-8 hours; alternatively, the solution should be allowed to stand at room temperature for 24-84 hours.

(B) Titanium oxide-based composite fine particles:

(1) The titanium oxide-based composite fine particles differ in composition depending on the embodiment. According to the first embodiment, they are composed of titanium oxide and iron oxide which are integrally combined with each other. According to the second embodiment, they are composed of titanium oxide and silicon oxide which are integrally combined with each other.

In either embodiments, the titanium oxide-based composite fine particles should be used in an amount of 0.2-5 parts (preferably 0.5-3 parts) for 1 part of the hydrolyzate of the silane compound. With an amount less than 0.2 part, they do not make the coating film to screen near ultraviolet rays. With an amount in excess of 5 parts, they cause the whitening of the coating film and reduce the scratch resistance of the coating film.

They should have a particle diameter of 1-100 nm (preferably 2-60 nm). With a particle diameter smaller than 1 nm, they do not improve the scratch resistance and refractive index of the coating film. With a particle diameter larger than 100 nm, they cause the whitening of the coating film.

(2) In the titanium oxide-based composite fine particles, titanium oxide combines with iron oxide or silicon oxide to form (a) a chemically combined composite oxide or (b) a solid solution, with titanium oxide dissolving iron oxide or silicon oxide therein.

The titanium oxide-based composite fine particles suppress the optical activity without impairing the characteristic properties (high refractive index), unlike the conventional fine particles made up of titanium oxide alone. Therefore, they protect both the coating film and substrate (optical plastic molding) from deterioration by near ultraviolet rays.

In the first embodiment, the ratio of iron oxide to titanium oxide should be 0.005-0.15 (preferably 0.01-0.7). With a ratio lower than 0.005, hardly the optical activity of titanium oxide can inhibit, with the result that the substrate (optical plastic molding) deteriorates and the coating film itself also deteriorates, leading to yellowing and poor adhesion. With a ratio in excess of 0.15, the fine particles brings about the coloring of the coating film by iron oxide, which limits the application area of the coating film for optical plastic molding.

In the second embodiment, the ratio of silicon oxide to titanium oxide should be 0.03-0.7 (preferably 0.05-0.5). With a ratio lower than 0.03, hardly the optical activity of titanium oxide can inhibit, with the result that the substrate (optical plastic molding) deteriorates and the coating film itself also deteriorates, leading to yellowing and poor adhesion. With a ratio in excess of 0.7, silicon oxide makes titanium oxide less effective in improving the refractive index of the coating film. This makes the coating film unsuitable for optical plastic moldings having a high refractive index and hence limits the application area of the coating film.

The titanium oxide-based composite fine particles in the first embodiment may also be incorporated with silicon oxide, so as to improve their compatibility with the above-mentioned silane compound at the time of preparation of the coating composition and to improve the light resistance of the coating film. In this case, the ratio of iron oxide to titanium oxide should be 0.005-1.0, preferably 0.01-0.7, and the ratio of silicon oxide to titanium oxide plus iron oxide should be 0.03-0.7, preferably 0.05-0.5. With too little a ratio of silicon oxide, the fine particles are poor in compatibility with the silane compound and hence the coating composition has a short pot life. Conversely, with too high a ratio of silicon oxide, the fine particles do not improve the refractive index of the coating film and hence the resulting coating film is not suitable for optical plastic moldings having a high refractive index.

(3) The combination of titanium oxide with iron oxide may be accomplished in the usual way (as disclosed in, for example, Japanese Patent Laid-open No.178219/1990) by deflocculating hydrated titanium oxide sol and hydrated iron oxide sol by the aid of an acid, dissolving the deflocculated product in hydrogen peroxide, and heating the solution for hydrolysis. Similarly, the combination of titanium oxide with iron oxide and silicon oxide may be accomplished by deflocculating hydrated titanium oxide sol and hydrated iron oxide sol by the aid of an acid, dissolving the deflocculated product in hydrogen peroxide, adding a dispersion of silicic acid, for example, which is prepared through dealkalization of an alkali-silicate aqueous solution, and heating the solution for hydrolysis.

The thus obtained hydrolyzate is a dispersion of fine particles. This hydrolyzate is preferably refined with ion exchange, reverse osmosis, ultrafiltration, or vacuum evaporation and so on.

(4) The titanium oxide-based composite fine particles should preferably be treated with a silane coupling agent for surface modification. The surface modification improves the compatibility of the fine particles with the silane compound, with the result that the coating composition has improved scratch resistance.

The surface modification makes the composite fine Particles readily dispersible as the result of blocking with a silane coupling agent the hydroxyl groups of titanium oxide, iron oxide, and silicon oxide. Examples of the silane coupling agent (as surface modifier) include tetramethoxysilane, methyltrimethoxysilane, trimethylchlorosilane, vinyltriethoxysilane, γ-glycidoxypropyltriethoxysilane, and γ-glycidoxypropylmethyldiethoxysilane. The surface modification may be done in the usual way by, for example, dipping the fine particles in an alcohol solution of the silane coupling agent.

(C) Polycarboxylic acid:

(1) The polycarboxylic acid is either saturated one or unsaturated one or an anhydride thereof. It should be used in an amount of 0.02–0.5 part, preferably 0.05–0.4 part, for 1 part of the hydrolyzate of the silane compound.

The polycarboxylic acid causes silanol groups to condensate after hydrolysis of the silane compound, giving rise to a polysiloxane having a carboxyl group in the side chain, so that the resulting coating composition is dyeable and provides a coating film having good resistance to heat, hot water, and wear, good antistatic property, and high surface hardness. In addition, the polycarboxylic acid also functions as a cocatalyst to activate the heat-curing catalyst mentioned later.

With an amount less than 0.02 part, the polycarboxylic acid is not enough to improve the coating film in hot water resistance, wear resistance, and surface hardness. With an amount in excess of 0.5 part, the polycarboxylic acid blooms to impair the appearance of the coating film.

(2) Examples of the polycarboxylic acid include maleic acid, maleic anhydride, fumaric acid, fumaric anhydride, itaconic acid, itaconic anhydride, citraconic acid, citraconic anhydride, malic acid, malic anhydride, tetrahydrophthalic acid, nadic anhydride, chloromaleic acid, HET acid (chlorendic acid), trimellitic acid, trimellitic anhydride, pyromellitic acid, and pyromellitic anhydride. Of these examples, maleic acid, itaconic acid, trimellitic acid, and trimellitic anhydride are preferable.

(D) Heat-curing catalyst:

(1) The heat-curing catalyst catalyzes the polymerization of epoxy groups in the silane compound and the polycondensation of silanol groups, thereby increasing the degree of crosslinking of the coating film resin.

The heat-curing catalyst should be used in an amount of 0.01–0.2 part, preferably 0.02–0.15 part, for 1 part of the hydrolyzate of the silane compound. With an amount less than 0.01 part, it does not impart sufficient hot water resistance, wear resistance, and surface hardness to the coating film. With an amount in excess of 0.2 part, it blooms to impair the appearance of the coating film.

(2) Examples of the heat-curing catalyst include imidazole compounds represented by the formula (3) below.

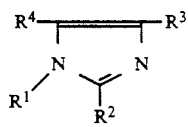

(where $R^1$ denotes hydrogen or a $C_{1-3}$ cyanoalkyl group; $R^2$ denotes hydrogen, a phenyl group, or a $C_{1-3}$ alkyl group; $R^3$ denotes hydrogen or a $C_{1-3}$ alkyl group, cyanoalkyl group, alkoxyalkyl group, or hydroxymethyl group; and $R^4$ denotes hydrogen, a hydroxymethyl group, or a $C_{1-3}$ alkoxyalkyl group.)

Examples of the imidazole compounds are given below.

2-methylimidazole,
2-ethylimidazole,
2-ethyl-4-ethylimidazole,
2-propylimidazole,
2-propyl-4-methylimidazole,
2-propyl-4-ethylimidazole,
2-phenylimidazole,
2-phenyl-4-methylimidazole,
1-cyanomethyl-2-methylimidazole,
1-cyanoethyl-2,4-dimethylimidazole,
1-cyanoethyl-2-propylimidazole,
1-cyanoethyl-2-phenylimidazole,
2-phenyl-4-methyl-5-hydroxymethylimidazole,
2-phenyl-4,5-dihydroxymethylimidazole,
1-cyanoethyl-2-phenyl-4,5-dicyanoethoxyimidazole.

Of these examples, the following in which the substituent $R^1$ is a cyanoalkyl group are preferable.

1-cyanoethyl-2-methylimidazole,
1-cyanoethyl-2,4-dimethylimidazole,
1-cyanoethyl-2-propylimidazole,
1-cyanoethyl-2-phenylimidazole,
1-cyano-2-phenyl-4,5-dicyanomethylimidazole.

In addition to the above-mentioned imidazole compounds, the heat-curing catalyst includes dicyandiamide, Reinecks's salt, and acetylacetone metal salt represented by the formula (4) below.

  (4)

(where M denotes Zn (III), Co (III), Fe (III), Cr (III), or Al (III); and n is an integer of 2 or 3 which corresponds to the valence of M.

(E) Preparation and application of the coating composition:

(1) The coating composition of the present invention should preferably be incorporated with a variety of additives to improve the performance of the coating film.

Examples of the additive to improve the adhesion of the coating film to the substrate (optical plastic molding) and to improve the dyeability of the coating film include polyolefin-based epoxy resin, polyglycidylester resin, polycondensate of epichlorohydrin and bisphenol A, glycidyl methacrylate, and acrylic copolymer.

Examples of the additive to protect the substrate from ultraviolet rays include benzophenone-based, benzotriazole-based, and phenol-based UV light absorbers.

The coating composition may also be incorporated with a silicone-based or fluorine-based surfactant as a leveling agent to improve the smoothness of the coating film.

(2) The coating composition of the present invention may be applied in the usual way by brushing, rolling, spraying, spin coating, or dipping. Application should be performed such that the coating thickness after drying is 0.5–20 μm, preferably 1–7 μm.

Prior to application, the substrate should undergo pretreatment such as degreasing (with an acid, alkali, detergent, or solvent), plasma treatment, and ultrasonic cleaning.

After application, the coating composition of the present invention should be cured by heating at 60°–150° C., preferably 80°–100° C., depending on the substrate, for 2–3 hours.

(3) The coating composition of the present invention may be applied to those substrates (optical plastic moldings) made of polymethyl methacrylate, polycarbonate, polystyrene, polyester, polyurethane, polythiourethane, aliphatic aryl carbonate, and aromatic aryl carbonate.

EMBODIMENTS

The invention will be described in more detail with reference to the following Examples and Comparative Examples, which are not intended to restrict the scope of the invention.

(A) Substrates and heat-curing catalysts:

(1) A molded product of polycarbonate ("Lexan" made by General Electric Co., Ltd.) was used as the substrate in Examples 1 to 3, and 1A to 3A, and Comparative Examples 1 to 3. A spectacle lens (specified below) was used as the substrate in Examples 4 to 10, and 4A to 10A, and Comparative Examples 4 to 6, 4A to 6A, and 7 and 9. The spectacle lens (80 mm in diameter, 2 mm thick at the center, and diopter −2.00D) was molded by casting from a monomer mixture composed of 90 parts of diallyl diphenate, 10 parts of urethane acrylate ("NKU-200AX" made by ShinNakamura Kogyo Co., Ltd.), and 4 parts of diisopropyl peroxydicarbonate.

(2) Heat-curing catalysts are identified by the following codes.

IM-4 . . . 2-ethyl-4-methylimidazole,
IM-8 . . . 2-phenyl-4-methylimidazole,
IM-12 . . . 1-cyanoethyl-2-methylimidazole.

(B) The coating film was tested for performance in the following manner. The results are shown in Tables 1 to 3.

(a) Wear resistance test

Wear resistance was tested by rubbing the sample with steel wool (#0000) and rated according to the following criteria.

A: hardly scratched
B: slightly scratched
C: heavily scratched (b) Surface hardness test Surface hardness was tested using a pencil scratch tester (1 kg load) according to JISK-5400. The result is expressed in terms of the highest pencil hardness at which the sample was not scratched.

(c) Appearance test

Appearance was evaluated by observing the presence or absence of interference fringe and haze. The observation of interference fringe (iridescent color) was accomplished by causing the sample to reflect the light from a fluorescent lamp* in a dark room. (* three-wavelength type, daylight color, "Lupica-Ace" 15W, made by Mitsubishi Electric Corporation.) Rating is based on the following criteria.

A: no iridescent color
B: slight iridescent color
C: apparent iridescent color

The observation of haze was accomplished by causing the sample to transmit light from a fluorescent lamp (as mentioned above) in a dark room.

(d) Adhesion test

Adhesion was tested according to JISD-0202 and the result is expressed in terms of the number of cross cuts (out of 100) which remained after three repetitions of peeling by cellophane adhesive tape.

(e) Hot water resistance test

Hot water resistance was evaluated by observing the appearance of the sample and the adhesion of the coating film after the sample had been immersed in boiling water (100° C.) for 1 hour.

(f) Weather resistance test

Weather resistance was evaluated by observing the appearance of the sample after exposure for 400 hours in an accelerated weathering tester ("Sunshine Superlonglife Weather-o-meter" made by Suga Shikenki Co., Ltd.)

(g) Dyeability test

Dyeability was evaluated by measuring the decrease of light (at 550 nm) passing through the sample which had been dipped in a dye solution for 5 minutes. The dye solution was prepared by dissolving 0.4 part of dye ("Dianix Brown 2B-FS" made by Mitsubishi Chemical Industries Ltd.) and 0.4 part of surface active agent ("GNK-01" made by Nihon Senka Kogyo Co., Ltd.) in 100 parts of hat water (90° C.). The decrease of light was measured using a luminous transmittance factor meter ("Core SMS-1" made by Uji-Kodensha Co., Ltd.). The dyeability is rated according to the following criteria.

good: decrease of light more than 30%
fair: decrease of light from 20% to 30%
poor: decrease of light less than 20%

EXAMPLES 1 TO 3 AND 1A TO 3A (1) Preparation of hydrolyzate of silane compound 125 parts of γ-glycidoxypropyltrimethoxysilane and 110 parts of tetraethoxysilane were mixed with 54 parts of 0.01N aqueous solution of hydrochloric acid by stirring at 60 rpm for 1 hour. The solution was diluted with 92 parts of methyl alcohol and 200 parts of methyl ethyl ketone by stirring for another 1 hour. The solution was allowed to stand at room temperature for 24 hours. The resulting hydrolyzate is designated as HG-40 hereinafter.

(2) Preparation of coating composition 290 parts of HG-40 was mixed with the titanium oxide-based composite fine particles as specified below.

(a) In Examples 1 to 3: 45 parts of "Optolake-1130F" (made by Catalysts and Chemicals Industries Co., Ltd.) $TiO_2/Fe_2O_3 = 98/2$, particle diameter = 15 nm, solids content = 30%, dispersing medium = methyl alcohol, surface modifier = tetraethoxysilane.

(b) In Examples 1A to 3A: 60 parts of "Queen Titanic-11" (made by Catalysts & Chemicals Industries Co., Ltd.) $TiO_2/SiO_2 = 85/15$, particle diameter = 15 nm, solids content = 30%, dispersing solvent = methyl alcohol, surface modifier = tetraethoxysilane.

Subsequently, 12 parts of itaconic acid was added by stirring at 120 rpm for 1 hour. Finally, 4 parts of imidazole compound (as the curing agent) as shown in Table 1 was added by stirring for 2 hours.

(3) Pretreatment of substrate

The substrate was immersed in a 0.05% solution of alkali cleaning agent ("Siliron HS" made by Hakusui Henkel Kogyo Co., Ltd.) at 50° C. for 3 minutes, followed by rinsing and oven drying.

(4) Formation of coating film

The coating composition was applied to the pretreated substrate by dipping (at a pull-up rate of 70 mm/min). Curing was carried out at 100° C. for 2 hours.

EXAMPLES 4 TO 6 AND 4A TO 6A (1) Preparation of hydrolyzate of silane compound 200 parts of γ-glycidoxypropyltrimethoxysilane and 35 parts of tetraethoxysilane were mixed with 92 parts of methyl alcohol and 54 parts of 0.01N aqueous solution of hydrochloric acid by stirring at 60 rpm for 2 hours. The solution was diluted with 200 parts of isopropyl alcohol by stirring for another 2 hours. The solution was allowed to stand at room temperature for 24 hours. The resulting hydrolyzate is designated as HG-41 hereinafter.

(2) Preparation of coating composition 290 parts of HG-41 was mixed with the titanium oxide-based composite fine particles as specified below.

(a) In Examples 4 to 6: 95 parts of "Optolake-1130F-1" (made by Catalysts and Chemicals Industries Co., Ltd.) $TiO_2/Fe_2O_3 = 95/5$, $SiO_2/(TiO_2+Fe_2O_3) = 10/90$, particle diameter = 15 nm, solids content = 30%, dispersing medium = methyl alcohol, surface modifier = vinyltriethoxysilane.

(b) In Examples 4A to 6A: 105 parts of "Queen Titanic-11-1" (made by Catalysts and Chemicals Industries Co., Ltd.) $TiO_2/SiO_2 = 70/30$, particle diameter = 15 nm, solids content = 30%, dispersing medium = methyl alcohol, surface modifier = tetraethoxysilane.

Subsequently, 12 parts of polycarboxylic acid as shown in Table 2 was added. Finally, 5 parts of acetylacetone zinc and 0.5 part of levelling agent ("Florad FC-430, made by Sumitomo 3M Co., Ltd.) were added.

(3) Pretreatment of substrate

The substrate was immersed in a 10% aqueous solution of sodium hydroxide (at 50° C.) for 10 minutes, followed by rinsing for 5 minutes, immersing in pure water for 3 minutes, and oven drying.

(4) Formation of coating film

The coating composition was applied to the pretreated substrate by dipping (at a level lowering rate of 90 mm/min). Curing was carried out at 100° C. for 2 hours.

EXAMPLES 7 AND 7A

The coating composition was prepared as follows: 290 parts of HG-40 was mixed with the titanium oxide-based composite fine particles as specified below.

(a) In Example 7: 90 parts of "Optolake-1130F-2" (made by Catalysts and Chemicals Industries Co., Ltd.) $TiO_2/Fe_2O_3 = 98/2$, $SiO_2/(TiO_2+Fe_2O_3) = 10/90$, particle diameter = 20 nm, solids content = 30%, dispersing medium = methyl alcohol, surface modifier = γ-glycidoxypropyltriethoxysilane.

(b) In Example 7A: 90 parts of "Queen Titanic-11" (made by Catalysts and Chemicals Industries Co., Ltd.), the same one as used in Example 1.

Subsequently, 10 parts of trimellitic anhydride was added. Finally, 5 parts of dicyandiamide and 2 parts of levelling agent ("SILWET L-77" made by Nippon Yunika Kogyo Co., Ltd.) were added.

The same procedure as in Example 4 was used for the pretreatment of the substrate and the formation of the coating film.

EXAMPLES 8 AND 8A

Each of the spectacle lenses prepared in Examples 7 and 7A underwent vacuum deposition for coating with $SiO_2$ (λ/4), $ZrO_2$ (λ/4), $SiO_2$ (λ/4), $ZrO_2$ (λ/4), $SiO_2$ (λ/4), $ZrO_2$ (λ/4), and $SiO_2$ (λ/2) (where λ=520 nm), in order starting from the obverse.

EXAMPLES 9 AND 9A

The same procedure as in Examples 7 and 7A was repeated except that 10 parts of trimellitic anhydride was replaced by 12 parts of itaconic acid.

EXAMPLES 10 AND 10A

Each of the spectacle lenses prepared in Examples 9 and 9A underwent vacuum deposition for coating with $SiO_2$ (λ/4), $ZrO_2$ (λ/4), $SiO_2+ZrO_2$ (λ/4), and $SiO_2$ (λ/8), (where λ=520 nm), in order starting from the obverse.

Comparative Examples 1 to 3 and 1A to 3A

These comparative examples are intended to show the effectiveness of the titanium oxide-based composite fine particles by comparing them with titanium oxide fine particles.

The same procedure as in Examples 1 to 3 and 1A to 3A was repeated except that the titanium oxide-based composite fine particles were replaced by titanium oxide fine particles "Sunveil 11-1530" (made by Catalysts and Chemicals Industries Co., Ltd., $TiO_2$ solids content = 30%, particle diameter = 15 nm), the dispersing medium was replaced by methyl alcohol, and the surface modifier was replaced by tetraethoxysilane.

Comparative Examples 4 to 6, 4A to 6A, 7 and 9

The same procedure as in Examples 4 to 7, 4A to 6Aa, 7 and 9, was repeated except that the titanium oxide-based composite fine particles were replaced by titanium oxide fine particles (the same one as used in Comparative Example 1).

(B) 0.2–5 parts by weight, based on 1 part by weight of the silane compound hydrolyzate, of titanium

TABLE 1

|  |  | Curing agent | Wear resistance | Surface hardness | Appearance (1) | Appearance (2) | Adhesion | Hot water resistance | Weather resistance | Dyeability |
|---|---|---|---|---|---|---|---|---|---|---|
| Example | 1 | IM-4 | A | 3H | A | good | 100/100 | good | good | good |
|  | 2 | IM-8 | B | 3H | A | good | 100/100 | good | good | good |
|  | 3 | IM-12 | B | 3H | A | good | 100/100 | good | good | fair |
|  | 1A | IM-4 | A | 3H | A | good | 100/100 | good | good | good |
|  | 2A | IM-8 | B | 3H | A | good | 100/100 | good | good | good |
|  | 3A | IM-12 | B | 3H | A | good | 100/100 | good | good | fair |
| Comparative Example | 1 | IM-4 | B | 3H | A | good | 100/100 | good | yellowed, peeled | good |
|  | 2 | IM-8 | B | 3H | A | good | 100/100 | good | yellowed peeled | good |
|  | 3 | IM-12 | C | 3H | A | cloudy | 100/100 | peeled | yellowed peeled | fair |
|  | 1A | IM-4 | B | 3H | A | good | 100/100 | good | yellowed peeled | good |
|  | 2A | IM-8 | B | 3H | A | good | 100/100 | good | yellowed peeled | good |
|  | 3A | IM-12 | C | 3H | A | cloudy | 100/100 | peeled | yellowed peeled | fair |

TABLE 2

|  |  | Polycarboxylic acid | Wear resistance | Surface hardness | Appearance (1) | Appearance (2) | Adhesion | Hot water resistance | Weather resistance | Dyeability |
|---|---|---|---|---|---|---|---|---|---|---|
| Example | 4 | Pyromellitic anhydride | B | 4H | A | cloudy | 100/100 | good | good | fair |
|  | 5 | Malic acid | A | 4H | A | good | 100/100 | good | good | good |
|  | 6 | Maleic acid | A | 4H | A | good | 100/100 | good | good | good |
|  | 7 | Trimellitic anhydride | A | 4H | A | good | 100/100 | good | good | good |
|  | 8 | Trimellitic anhydride | A | 4H | A | good | 100/100 | *1 | good | *2 |
|  | 9 | Itaconic acid | A | 4H | A | good | 100/100 | good | good | good |
|  | 10 | Itaconic acid | A | 4H | A | good | 100/100 | *1 | good | *2 |
|  | 4A | Phthalic anhydride | B | 4H | A | cloudy | 100/100 | good | good | fair |
|  | 5A | Malic acid | A | 4H | A | good | 100/100 | good | good | good |
|  | 6A | Maleic acid | A | 4H | A | good | 100/100 | good | good | good |
|  | 7A | Trimellitic anhydride | A | 4H | A | good | 100/100 | good | good | good |
|  | 8A | Trimellitic anhydride | A | 4H | A | good | 100/100 | *1 | good | *2 |
|  | 9A | Itaconic acid | A | 4H | A | good | 100/100 | good | good | good |
|  | 10A | Itaconic acid | A | 4H | A | good | 100/100 | *1 | good | *2 |

*1: The hot water resistance test was not performed because the vacuum deposited film lacks hot water resistance at 100° C. for 1 hour.
*2: The dyeability test was not performed because the vacuum deposited film is not dyeable.

TABLE 3

|  |  | Polycarboxylic acid | Wear resistance | Surface hardness | Appearance (1) | Appearance (2) | Adhesion | Hot water resistance | Weather resistance | Dyeability |
|---|---|---|---|---|---|---|---|---|---|---|
| Comparative Example | 4 | Pyromellitic anhydride | B | 4H | A | cloudy | 100/100 | peeled | yellowed peeled | fair |
|  | 5 | Malic acid | B | 4H | A | good | 100/100 | good | yellowed peeled | good |
|  | 6 | Maleic acid | B | 4H | A | good | 100/100 | good | yellowed peeled | good |
|  | 4A | Phthalic anhydride | B | 4H | A | cloudy | 100/100 | peeled | yellowed peeled | fair |
|  | 5A | Malic acid | B | 4H | A | good | 100/100 | good | yellowed peeled | good |
|  | 6A | Maleic acid | B | 4H | A | good | 100/100 | good | yellowed peeled | good |
|  | 7 | Trimellitic anhydride | B | 4H | A | good | 100/100 | good | yellowed peeled | good |
|  | 9 | Itaconic acid | B | 4H | A | good | 100/100 | good | yellowed peeled | good |

What is claimed is:
1. A coating composition for optical plastic moldings which comprises:
(A) 1 part by weight of a hydrolyzate of a silane compound;

oxide-based composite fine particles having a particle diameter of 1–100 nm in which titanium oxide integrally combines with iron oxide, with the ratio of iron oxide to titanium oxide being 0.005–0.15 by weight;

(C) 0.02–0.5 part by weight, based on 1 part by weight of the silane compound hydrolyzate, of an unsaturated or saturated polycarboxylic acid or an anhydride thereof; and (D) 0.01–0.2 part by weight, based on 1 part by weight of the silane compound hydrolyzate, of a heat-curing catalyst.

2. A coating composition for optical plastic moldings as defined in claim 1, wherein the silane compound is one which is represented by the formula below.

$$R_a^1 R_b^2 Si(OR^3)_{4-(a+b)}$$

where $R^1$ denotes a $C_{2-8}$ organic group having an epoxy group; $R^2$ is a $C_{1-3}$ hydrocarbon group, halogenated hydrocarbon group, or aryl group; $R^3$ is a $C_{1-4}$ alkyl group, alkoxyalkyl group, or acyl group; and $a=1$, $b=0$, 1 or 2.

3. A coating composition for optical plastic moldings as defined in claim 1, wherein the titanium oxide-based composite fine particles are those in which titanium oxide is integrally combined with iron oxide and silicon oxide, with the ratio of iron oxide/titanium oxide being from 0.005 to 0.15 and the ratio of silicon oxide/(iron oxide+titanium oxide) being from 0.03 to 0.70 by weight.

4. A coating composition for optical plastic moldings as defined in claim 1, wherein the titanium oxide-based composite fine particles are those which are surface-modified with a silane coupling agent.

5. A coating composition for optical plastic moldings which comprises:

(A) 1 part by weight of a hydrolyzate of a silane compound;

(B) 0.2–5 parts by weight, based on 1 part by weight of the silane compound hydrolyzate, of titanium oxide-based composite fine particles having a particle diameter of 1–100 nm in which titanium oxide integrally combines with silicon oxide, with the ratio of silicon oxide to titanium oxide being 0.03–0.7 by weight;

(C) 0.02–0.5 part by weight, based on 1 part by weight of the silane compound hydrolyzate, of an unsaturated or saturated polycarboxylic acid or an anhydride thereof; and (D) 0.01–0.2 part by weight, based on 1 part by weight of the silane compound hydrolyzate, of a heat-curing catalyst, wherein the titanium oxide-based composite fine particles are those which are surface-modified with a silane coupling agent.

* * * * *